US007326114B2

(12) United States Patent
Webb et al.

(10) Patent No.: US 7,326,114 B2
(45) Date of Patent: *Feb. 5, 2008

(54) GAMING DEVICE HAVING AN OFFER AND ACCEPTANCE SELECTION BONUS SCHEME WITH A TERMINATOR AND AN ANTI-TERMINATOR

(76) Inventors: Bayard S. Webb, 3215 Palacio Ct., Reno, NV (US) 89509; Anthony J. Baerlocher, 3339 Skyline Blvd., Reno, NV (US) 89509; Gregg J. Palmer, 910 Joshua Dr., Reno, NV (US) 89509

( * ) Notice: Subject to any disclaimer, the term of this patent is extended or adjusted under 35 U.S.C. 154(b) by 862 days.

This patent is subject to a terminal disclaimer.

(21) Appl. No.: 10/644,447

(22) Filed: Aug. 18, 2003

(65) Prior Publication Data

US 2004/0038729 A1 Feb. 26, 2004

Related U.S. Application Data

(63) Continuation of application No. 09/945,082, filed on Aug. 31, 2001, now Pat. No. 6,632,141.

(51) Int. Cl.
*A63F 13/00* (2006.01)

(52) U.S. Cl. .......................................... 463/25; 463/20

(58) Field of Classification Search .................. 463/20
See application file for complete search history.

(56) References Cited

U.S. PATENT DOCUMENTS

| | | | |
|---|---|---|---|
| 4,448,419 | A | 5/1984 | Telnaes |
| 4,582,324 | A | 4/1986 | Koza et al. |
| 4,624,459 | A | 11/1986 | Kaufman |
| 4,695,053 | A | 9/1987 | Vazquez, Jr. et al. |
| 4,991,848 | A | 2/1991 | Greenwood et al. |
| 5,033,744 | A | 7/1991 | Bridgeman et al. |

(Continued)

FOREIGN PATENT DOCUMENTS

EP 0874337 A1 10/1998

(Continued)

OTHER PUBLICATIONS

Addams Family Advertisement and Article written by IGT, Strictly Slots, published in 2000.

(Continued)

*Primary Examiner*—John M. Hotaling, II
(74) *Attorney, Agent, or Firm*—Bell, Boyd & Lloyd LLP

(57) ABSTRACT

A gaming device having an offer/acceptance type bonus game. One embodiment provides a plurality player selectable selections wherein each selection has an associated offer, anti-terminator or terminator. The gaming device enables the player to pick the selections. If a terminator is associated with the selection, the game ends unless the player has previously picked an anti-terminator associated with a selection. When the player picks an anti-terminator, the processor retains or accumulates the anti-terminator until a terminator is selected. The anti-terminator nullifies the effect of the terminator and allows the game to continue. The gaming device thus includes the combination of an offer acceptance scheme having at least one terminator and at least one anti-terminator.

49 Claims, 10 Drawing Sheets

U.S. PATENT DOCUMENTS 5,178,390 A 1/1993 Okada
5,205,555 A 4/1993 Hamano
5,342,047 A 8/1994 Heidel et al.
5,456,465 A 10/1995 Durham
5,524,888 A 6/1996 Heidel
5,536,016 A 7/1996 Thompson
5,542,669 A 8/1996 Charron et al.
5,560,603 A 10/1996 Seelig et al.
5,611,535 A 3/1997 Tiberio
5,711,525 A 1/1998 Breeding
5,769,716 A 6/1998 Saffari et al.
5,772,509 A 6/1998 Weiss
5,775,692 A 7/1998 Watts et al.
5,788,573 A 8/1998 Baerlocher et al.
5,823,874 A 10/1998 Adams
5,833,538 A 11/1998 Weiss
5,848,932 A 12/1998 Adams
5,851,148 A 12/1998 Brune et al.
5,873,781 A 2/1999 Keane
5,882,261 A 3/1999 Adams
5,902,184 A 5/1999 Bennett et al.
5,911,418 A 6/1999 Adams
5,935,002 A 8/1999 Falciglia
5,947,820 A 9/1999 Morro et al.
5,951,397 A 9/1999 Dickinson
5,964,463 A 10/1999 Moore, Jr.
5,967,894 A 10/1999 Kinoshita et al.
5,980,384 A 11/1999 Barrie
5,984,781 A 11/1999 Sunaga
5,997,400 A 12/1999 Seelig et al.
5,997,401 A 12/1999 Crawford
6,001,016 A * 12/1999 Walker et al. ................ 463/42
6,004,207 A 12/1999 Wilson, Jr. et al.
6,010,404 A * 1/2000 Walker et al. ................ 463/21
6,015,346 A 1/2000 Bennett
6,019,369 A 2/2000 Nakagawa et al.
6,033,307 A 3/2000 Vancura
6,047,963 A * 4/2000 Pierce et al. ............ 273/121 B
6,056,642 A 5/2000 Bennett
6,059,289 A 5/2000 Vancura
6,059,658 A 5/2000 Mangano et al.
6,062,980 A 5/2000 Luciano
6,089,976 A 7/2000 Schneider et al.
6,089,977 A 7/2000 Bennett
6,089,978 A 7/2000 Adams
6,093,102 A 7/2000 Bennett
6,102,798 A 8/2000 Bennett
6,120,031 A 9/2000 Adams
6,126,541 A 10/2000 Fuchs
6,126,542 A 10/2000 Fier
6,142,873 A 11/2000 Weiss et al.
6,142,874 A 11/2000 Kodachi et al.
6,142,875 A 11/2000 Kodachi et al.
6,146,273 A 11/2000 Olsen
6,159,095 A 12/2000 Frohm et al.
6,159,096 A 12/2000 Yoseloff
6,159,097 A 12/2000 Gura
6,159,098 A 12/2000 Slomiany et al.
6,162,121 A 12/2000 Morro et al.
6,168,520 B1 1/2001 Baerlocher et al.
6,168,523 B1 1/2001 Piechowiak et al.
6,173,955 B1 1/2001 Perrie et al.
6,174,233 B1 1/2001 Sunaga et al.
6,174,235 B1 1/2001 Walker et al.
6,190,254 B1 2/2001 Bennett
6,190,255 B1 * 2/2001 Thomas et al. ............... 463/20
6,203,429 B1 3/2001 Demar et al.
6,210,279 B1 4/2001 Dickinson
6,213,876 B1 4/2001 Moore, Jr.
6,224,483 B1 5/2001 Mayeroff
6,231,442 B1 5/2001 Mayeroff
6,231,445 B1 5/2001 Acres
6,261,177 B1 7/2001 Bennett
6,302,790 B1 10/2001 Brossard
6,305,686 B1 10/2001 Perrie et al.
6,309,300 B1 10/2001 Glavich
6,328,649 B1 12/2001 Randall et al.
6,375,187 B1 4/2002 Baerlocher
6,494,785 B1 * 12/2002 Gerrard et al. ............... 463/20
6,506,118 B1 * 1/2003 Baerlocher et al. ........... 463/25
6,514,141 B1 2/2003 Kaminkow et al.
6,569,015 B1 5/2003 Baerlocher et al.
6,599,192 B1 7/2003 Baerlocher et al.
6,632,141 B2 10/2003 Webb et al.
6,648,754 B2 11/2003 Baerlocher et al.
6,692,355 B2 2/2004 Baerlocher et al.
6,719,632 B2 4/2004 Palmer et al.
6,722,981 B2 4/2004 Kaminkow et al.
6,722,982 B2 4/2004 Kaminkow et al.
6,758,750 B2 7/2004 Baerlocher et al.
6,786,820 B2 9/2004 Gerrard et al.
6,793,579 B2 9/2004 Baerlocher et al.
6,796,905 B2 9/2004 Baerlocher et al.
6,808,452 B2 10/2004 Baerlocher et al.
6,808,454 B2 10/2004 Gerrard et al.
6,811,483 B1 11/2004 Webb et al.
6,852,030 B2 2/2005 Baerlocher et al.
6,890,257 B2 5/2005 Baerlocher
6,899,623 B2 5/2005 Baerlocher
6,942,566 B2 9/2005 Baerlocher et al.
6,960,132 B2 11/2005 Baerlocher et al.
6,966,833 B2 11/2005 Kaminkow et al.
6,971,953 B2 12/2005 Gerrard et al.
2004/0180710 A1 9/2004 Palmer et al.
2004/0185928 A1 9/2004 Baerlocher et al.
2004/0214632 A1 10/2004 Cuddy et al.
2005/0020346 A1 1/2005 Baerlocher
2005/0032567 A1 2/2005 Baerlocher et al.
2005/0037829 A1 2/2005 Baerlocher et al.
2005/0101375 A1 5/2005 Webb et al.
2005/0130729 A1 6/2005 Baerlocher et al.
2005/0187010 A1 8/2005 Baerlocher
2005/0266914 A1 12/2005 Baerlocher et al.
2006/0003837 A1 1/2006 Baerlocher et al.

FOREIGN PATENT DOCUMENTS

EP 0926645 A2 6/1999
EP 0944030 A2 9/1999
EP 0945837 A2 9/1999
EP 0981119 A2 2/2000
EP 0984408 A2 3/2000
EP 0984409 A2 3/2000
WO WO 9732285 9/1997
WO WO 0012186 3/2000

OTHER PUBLICATIONS

Adders and Ladders Advertisement written by Barcrest Ltd., published prior to 2000.
American Thunder Screen Shots written by IGT, published in 1998.
Big Bang Piggy Bankin Advertisement written by WMS Gaming, Inc., published prior to 2000.
Blackjack/Twenty-One Description written by Hoyle's Rules of Games, published in 1993.
Bonus Spin Red, White & Blue Advertisement written by IGT, published in 2000.
Bonus Times Article written by Strictly Slots, published in 2000.
By George written by IGT, published in 2002.
Caribbean Gold II Advertisement written by Aristocrat Incorporated, published in 1998.
Cash Box Advertisement & Article written by Anchor Games, Strictly Slots, published in 2000.
Chutes & Ladders Game Instructions written by Hasbro-Milton Bradley, published in 1999.

Description of Let's Make a Deal Television Show written by letsmakeadeal.com (2 pages), printed on Mar. 16, 2006.
Double Diamond Game Descriptions written by IGT printed on Mar. 21, 2001.
Double Up Poker Game Description written by IGT Undated.
Easy Street Advertisements and Articles written by Casino Data Systems, published in 2000.
Elvis Advertisement written by IGT, published in 1999.
Empire Game Advertisement written by AC Coin, published in 1996.
Fire and Fortune Article written by Strictly Slots, published in 2001.
Fox "N" Hound Advertisement written by IGT, published in 2000.
In Between Games Description written by IGT, available prior to 2000.
Jackpot Party Brochures and Articles, written by WMS Gaming, Inc., published in 1998.
Keep Your Hat On Advertisement written by Aristocrat, published in 2001.
Let's Make a Deal written by geocities.com (10 pages), printed on Mar. 21, 2001.
Let's Make a Deal written by fortunecity.com (4 pages), printed on Mar. 21, 2001.
Let's Make a Deal written by Illinoislottery.com (1 page), printed on Mar. 21, 2001.
Let's Make a Deal geocities.com (2 pages), printed on Mar. 16, 2001.
Let's Make A Deal Advertisement written by Shuffle Master and IGT, published in 2001.
Let's Make a Deal Game Advertisement written by Bally Gaming Systems, published in 1999.
Little Green Men Advertisement and Article written by IGT, Strictly Slots, published in 2000.
MegaJackpots Advertisement written by IGT, published in 1998.
Money Grab Article written by Strictly Slots, published in Apr. 2001.
Money in the Bank Advertisement written by Strictly Slots Konami, published in 2001.
Monopoly Brochures and Articles, written by WMS Gaming, Inc., published in 1998.
Monopoly Party Train Article written by Strictly Slots, published in 2002.
Neon Nights written by IGT, published in 2000.
On the Money Article written by Strictly Slots, Casino Data Systems, published in Dec. 2000.
Polly & Roger Advertisement written by VLC, Inc., published in 2000.
Price is Right "Cliff Hangers" Description written by www.geocities.com; members.aol.com (web site), printed Mar. 21, 2001.
Price is Right "Showcases" Description written by schuminweb.com (web site), printed Mar. 16, 2001.
Psycho Cash Beast Club (including knockouts) written by Barcrest, published prior to 1998.
Punch-a-Bunch/The Punch Board, http://gscentral.net/punch.htm, pp. 1-5 (1978).
Richard Petty Advertisement written by IGT, published in 2000.
South Park—Dodgeball Advertisement written by IGT, published in 2000.
Spell Binder Advertisement written by IGT, published in 2000.
Sphinx Advertisement written by Atronic Casino Technology, Ltd., published in 1997.
Take Your Pick Article written by Strictly Slots, published in Mar. 2001.
Take Your Pick Advertisement written by IGT/Anchor Gaming, published in 1999.
Texas Tea Advertisment written by IGT, published in 2000.
The Deals of Let's Make a Deal written by fortunecity.com (2 pages), printed on Mar. 16, 2001.
The Official Let's Make a Deal Website written by Bally Gaming System Website, printed Mar. 16, 2001.
Top Cat Advertisement written by WMS Gaming, Inc., published prior to 2000.
Top Dollar Brochure, written by IGT, published in 1999.
Totem Pole Advertisement written by IGT, published in 1997.
Treasure Wheel/Treasure Tunnel Advertisement written by Sigma Game, Inc., published prior to 2000.
Wheel of Fortune Advertisement written by IGT, published in 1998.
Wheel of Fortune Advertisement written by IGT, published in 1999.
Wheel Poker Article written by Strictly Slots (Anchor Games), published in Nov. 2000.
Winning Streak Web Site Description written by WMS Gaming, Inc. (web site), printed on Mar. 21, 2001.
X Factor Advertisement and Website Page written by WMS Gaming, Inc., published in 1998.

* cited by examiner

GAMING DEVICE HAVING AN OFFER AND ACCEPTANCE SELECTION BONUS SCHEME WITH A TERMINATOR AND AN ANTI-TERMINATOR

PRIORITY CLAIM

This application is a continuation of and claims the benefit of U.S. patent application Ser. No. 09/945,082, filed Aug. 31, 2001 now U.S. Pat. No. 6,632,141.

CROSS REFERENCE TO RELATED APPLICATIONS

This application is related to the following commonly-owned co-pending patent applications: "GAMING DEVICE HAVING SEPARATELY CHANGEABLE VALUE AND MODIFIER BONUS SCHEME," Ser. No. 09/626,045, "GAMING DEVICE HAVING A BONUS ROUND WITH MULTIPLE RANDOM AWARD GENERATION AND MULTIPLE RETURN/RISK SCENARIOS," Ser. No. 09/678,989, "GAMING DEVICE HAVING AN AWARD EXCHANGE BONUS ROUND AND METHOD FOR REVEALING AWARD EXCHANGE POSSIBILITIES," Ser. No. 09/689,510, "GAMING DEVICE HAVING GRADUATING AWARD EXCHANGE SEQUENCE WITH A TEASE CONSOLATION SEQUENCE AND AN INITIAL QUALIFYING SEQUENCE," Ser. No. 09/680,601, "GAMING DEVICE HAVING A DESTINATION PURSUIT BONUS SCHEME WITH ADVANCED AND SETBACK CONDITIONS," Ser. No. 09/686,409, "GAMING DEVICE HAVING VALUE SELECTION BONUS," Ser. No. 09/684,605, "GAMING DEVICE HAVING RISK EVALUATION BONUS ROUND," Ser. No. 09/688,434, "GAMING DEVICE HAVING AN IMPROVED OFFER/ACCEPTANCE BONUS SCHEME," Ser. No. 09/966,884, "GAMING DEVICE HAVING IMPROVED OFFER AND ACCEPTANCE BONUS SCHEME," Ser. No. 09/680,630, "GAMING DEVICE HAVING IMPROVED AWARD OFFER BONUS SCHEME," Ser. No. 09/682,368, "GAMING DEVICE HAVING OFFER AND ACCEPTANCE GAME WITH HIDDEN OFFER," Ser. No. 10/160,688, "GAMING DEVICE HAVING OFFER ACCEPTANCE GAME WITH TERMINATION LIMIT," Ser. No. 09/822,711, "GAMING DEVICE HAVING OFFER/ACCEPTANCE ADVANCE THRESHOLD AND LIMIT BONUS SCHEME," Ser. No. 09/838,014, "GAMING DEVICE HAVING IMPROVED OFFER AND ACCEPTANCE GAME WITH MASKED OFFERS," Ser. No. 10/086,014, "GAMING DEVICE HAVING AN AWARD OFFER AND TERMINATION BONUS SCHEME," Ser. No. 09/682,428, "GAMING DEVICE HAVING AN OFFER AND ACCEPTANCE GAME WITH A PLAYER SELECTION FEATURE," Ser. No. 10/086,078, and "GAMING DEVICE HAVING IMPROVED OFFER AND ACCEPTANCE BONUS SCHEME," Ser. No. 10/074,273.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device having an offer and acceptance selection bonus scheme with a terminator and a multi-functional anti-terminator.

BACKGROUND OF THE INVENTION

Gaming devices, such as slot machines, having primary and secondary or bonus games or schemes are well known. One well known bonus game provides a player with a series of award offers consisting of credits or dollars. The player may either accept each award offer or reject each award offer; however, the player must accept the final award offer. If the player accepts an award offer, the player keeps the award offered. If the player rejects the award offer, the gaming device provides another award offer to the player except if the award offer is the final award offer. The award offers are randomly determined from a series of award offers of differing values.

Other known gaming devices, such as the gaming device disclosed in European Patent No. EP 09454837A2 utilize terminators. In the gaming device disclosed therein, the gaming device provides a plurality of selections in a bonus game. The selections include masked or hidden awards and terminators. The player receives an award for each selection picked by the player that is not a terminator. The player continues to pick selections until the player obtains a terminator. The terminator ends the bonus game and the player receives the total of all the awards they obtained during the bonus game.

Other known gaming devices, such as the gaming device disclosed in U.S. Pat. No. 6,190,255 B1 utilize an anti-terminator. In the gaming device disclosed therein, upon a specific symbol combination in the basic mode, the gaming device generates an anti-terminator which is subsequently exercisable in a bonus game of the gaming device. Until the gaming device activates the bonus mode, the player may continue obtaining anti-terminators in the basic mode. In the bonus mode, a player may use an anti-terminator to override an otherwise undesired outcome of the bonus game. For example, if in the bonus mode the player obtained an outcome that would end the bonus mode, an anti-terminator, if available, may be used to override the end bonus mode outcome and thereby continue play of the bonus mode.

While this type of gaming device has achieved significant popularity in the gaming industry, after playing the game repeatedly, players may lose interest in the game. Furthermore, gaming devices having offer and acceptance games have not included a plurality of selections including terminators and anti-terminators in a bonus scheme. Accordingly, there is a need for a new gaming device having an offer and acceptance selection bonus scheme with a terminator and an anti-terminator.

SUMMARY OF THE INVENTION

The present invention provides a gaming device having an improved offer and acceptance bonus scheme. In one embodiment of the present invention, the gaming device provides a player a plurality of opportunities to pick from a plurality of selections. Each selection has an offer or symbol randomly associated with it. The offers may be randomly determined or arranged prior to or during the selection process from a pool of offers. The player picks one of the selections and the gaming device reveals the offer or symbol associated with that selection. If the player accepts the revealed offer, the player obtains the revealed offer and the bonus game ends. If the player does not accept the revealed offer, and the offer is not the final offer, the player may make another selection from the plurality of selections. If the player has not accepted any of the offers prior to the last possible offer, the gaming device provides the player with the last offer, which the player cannot reject.

A terminator or termination symbol is associated with at least one selection and an anti-terminator or anti-termination symbol is associated with at least one selection. If the player picks a selection that has a termination symbol associated with it, the bonus scheme ends. If a player obtains the termination symbol, the game will provide no award, provide the player the last rejected award, provide the player a consolation award or select another award to provide the player. If the player picks a selection that has an anti-termination symbol associated with it, the player retains the anti-termination symbol and picks another selection. If the player subsequently picks a selection that has a termination symbol associated with it, the retained anti-termination symbol nullifies the bonus scheme ending effect of the termination symbol. It should be appreciated that alternative embodiments can include multiple termination symbols, multiple anti-termination symbols and combinations thereof.

It is therefore an advantage of the present invention to provide a gaming device having an offer and acceptance selection bonus scheme with a terminator and an anti-terminator.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Figure 1A:
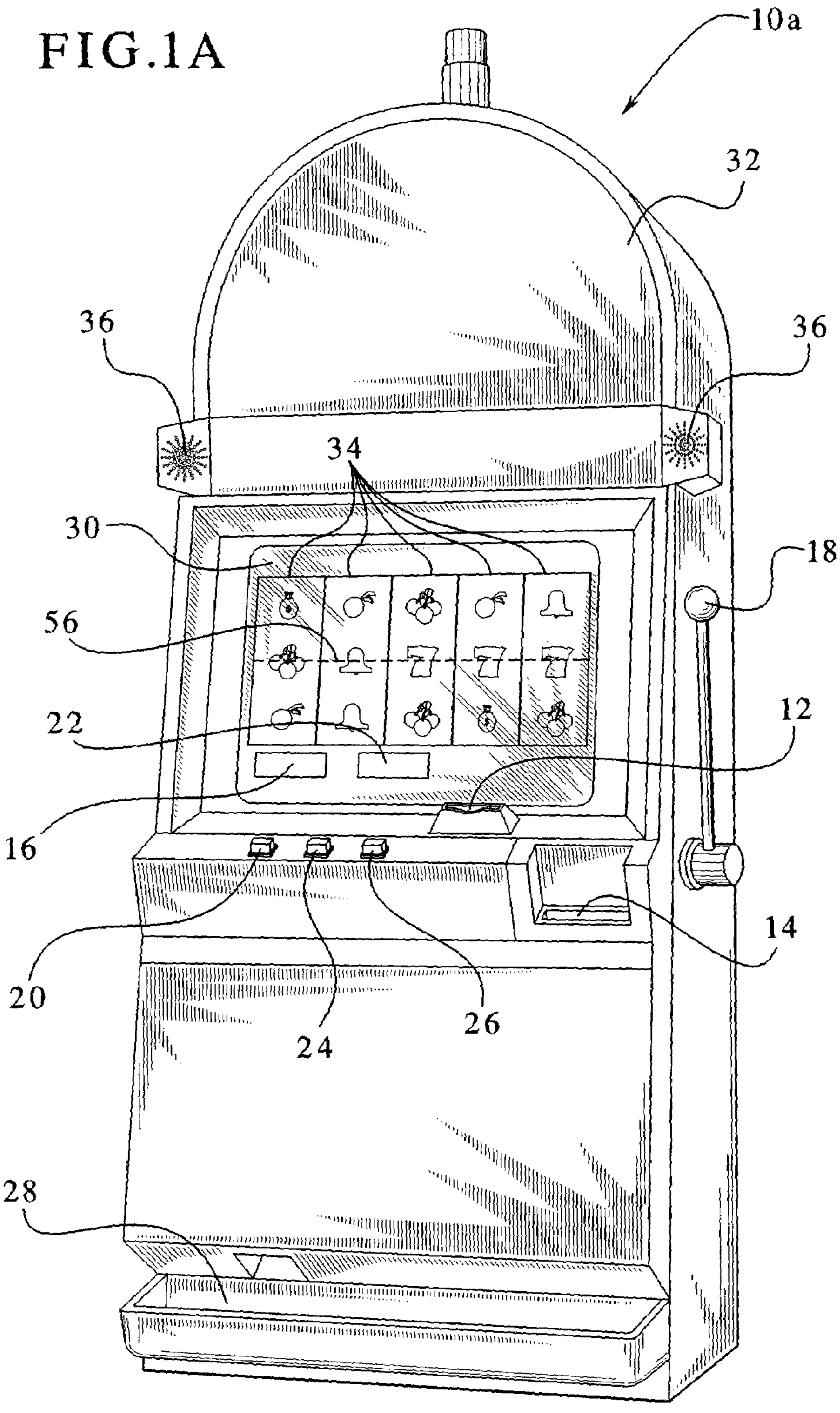
FIGS. 1A and 1B are perspective views of alternative embodiments of the gaming device of the present invention.
Figure 1B:
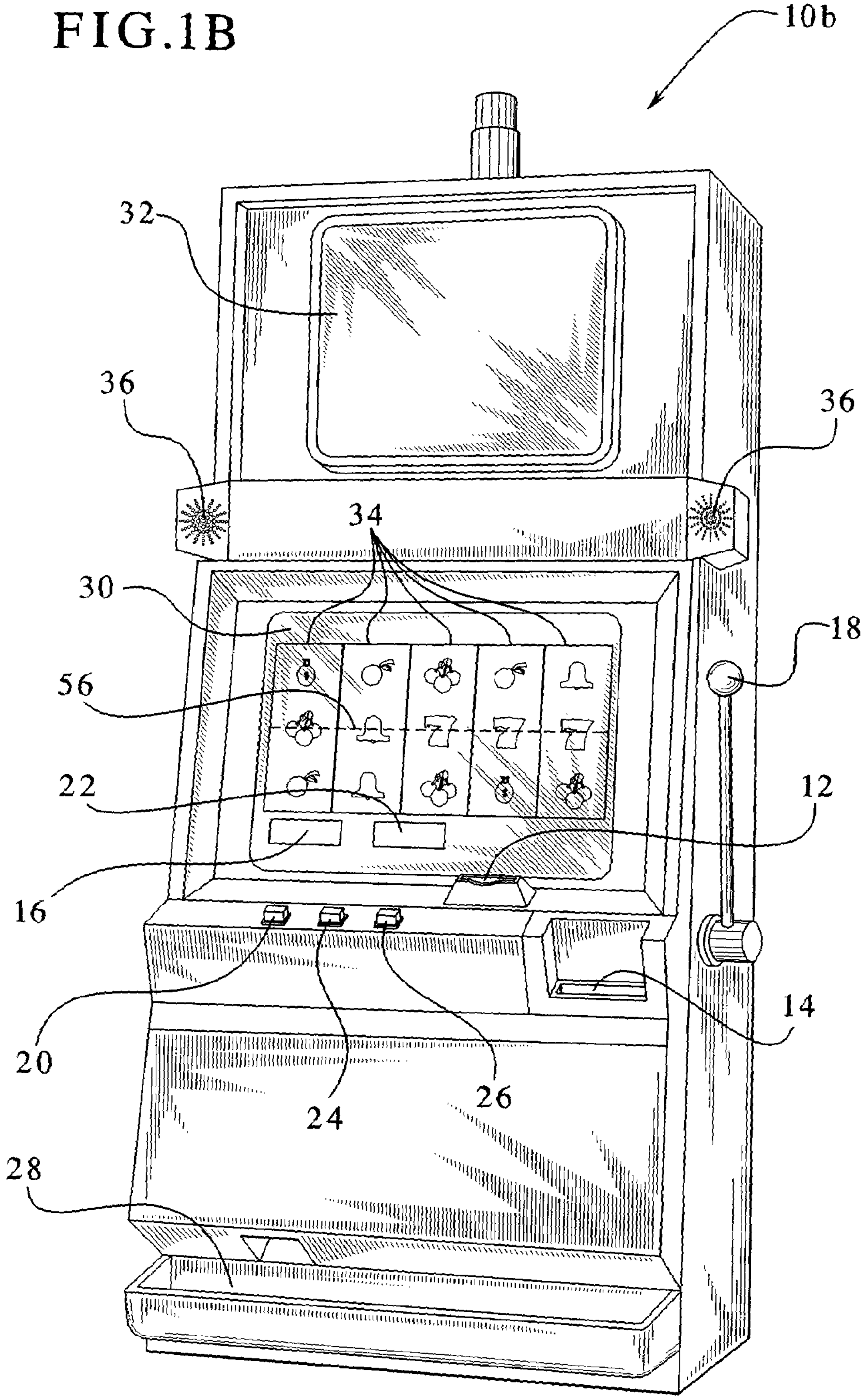

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is preferably a slot machine having the controls, displays and features of a conventional slot machine. It is constructed so that a player can operate it while standing or sitting, and gaming device 10 is preferably mounted on a console. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, poker or keno, any of their bonus triggering events and any of their bonus round games. The symbols and indicia used on and in gaming device 10 may be in mechanical, electrical or video form.

As illustrated in FIGS. 1A and 1B, gaming device 10 includes a coin slot 12 and bill acceptor 14 where the player inserts money, coins or tokens. The player can place coins in the coin slot 12 or paper money in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

At any time during the game, a player may "cash out" and thereby receive a number of coins corresponding to the number of remaining credits by pushing a cash out button 26. When the player "cashes out," the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 preferably displays a plurality of reels 34, preferably three to five reels 34 in mechanical or video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other display mechanism. If the reels 34 are in video form, the display device for the video reels 34 is preferably a video monitor.

Each reel 34 displays a plurality of indicia such as bells, hearts, fruits, numbers, letters, bars or other images which preferably correspond to a theme associated with the gaming device 10. Furthermore, gaming device 10 preferably includes speakers 36 for making sounds or playing music.

Figure 2:
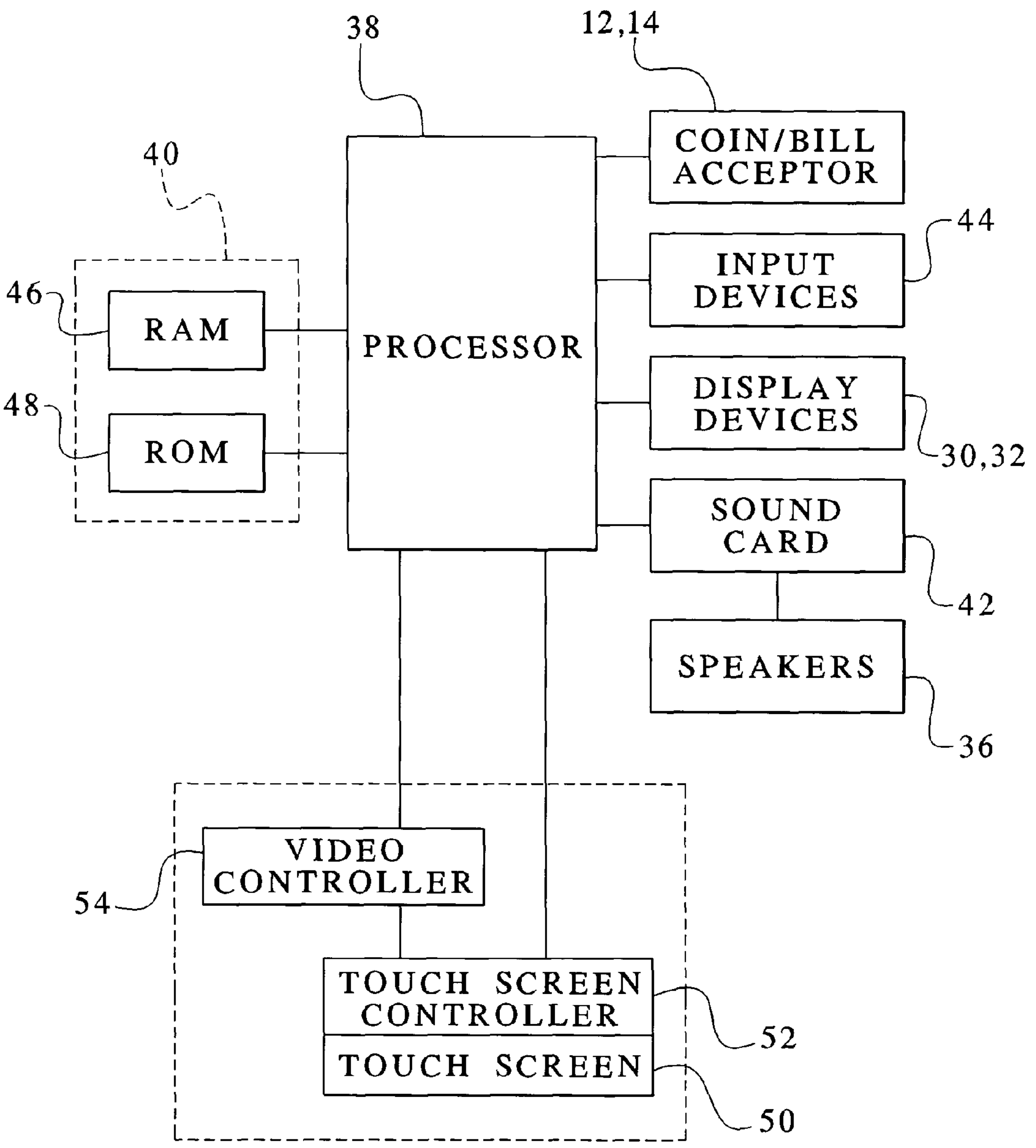
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 is generally referred to herein as the computer or controller.

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, preferably gaming device 10 also gives players the opportunity to win credits in a bonus round. This type of gaming device 10 will include a program which will automatically begin a bonus round when the player has achieved a qualifying condition in the game. This qualifying condition can be a particular arrangement of indicia on a display device. The gaming device 10 preferably uses a video-based central display device 30 to enable the player to play the bonus round. Preferably, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines displayed in a horizontal and/or diagonal fashion.

Bonus Scheme

Figure 3A:
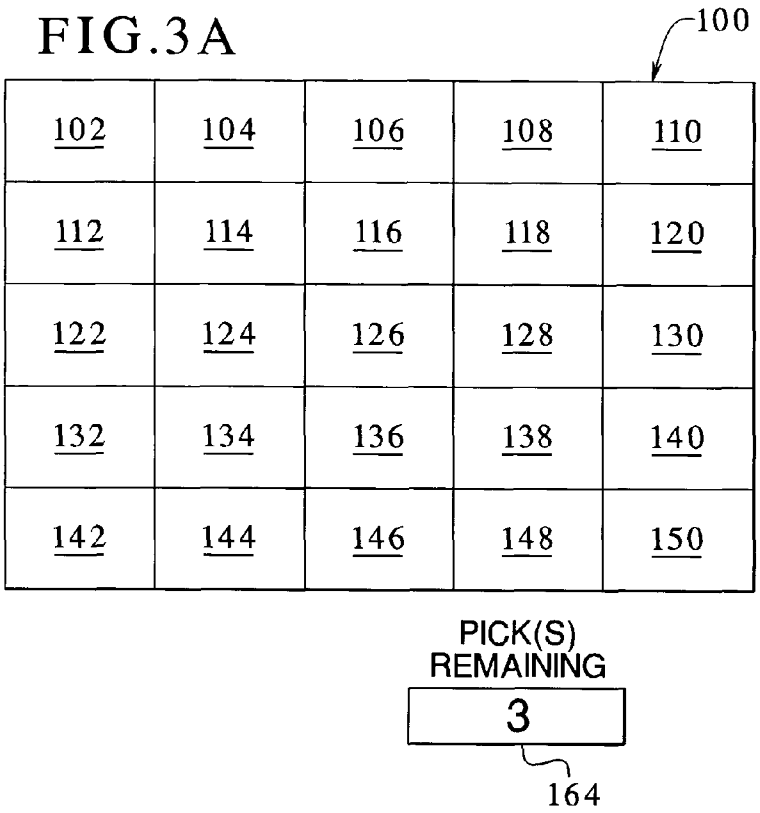
FIG. 3A is a front elevational view of the offer selection screen of one embodiment of the present invention illustrating a plurality of selections which the player can select to obtain an offer.

Referring now to FIG. 3A, one embodiment of the offer and acceptance selection bonus scheme of the present invention provides a screen or display 100 which is preferably a touch screen, which enables the player to make selections to obtain or to be offered the offers. The game preferably provides a plurality of selections on the screen or display which the player may choose from. The touch screen functions as a selector which enables the player to pick the selections. It should be appreciated that any other suitable device could be employed as a selector for enabling the player to select the selections. An offer, a termination symbol, or an anti-termination symbol is associated with each selection. The gaming device does not initially display the offer (such as a credit or dollar amount) or symbol associated with each selection.

In one embodiment, the offer or symbol associated with each selection is randomly determined each time the bonus scheme is triggered. In this embodiment, after an offer or symbol is associated with a selection, that association remains fixed for the duration of the bonus scheme. In an alternative embodiment, the offer or symbol associated with each selection is randomly determined prior to each time the player is allowed to pick a selection.

Figure 4A:
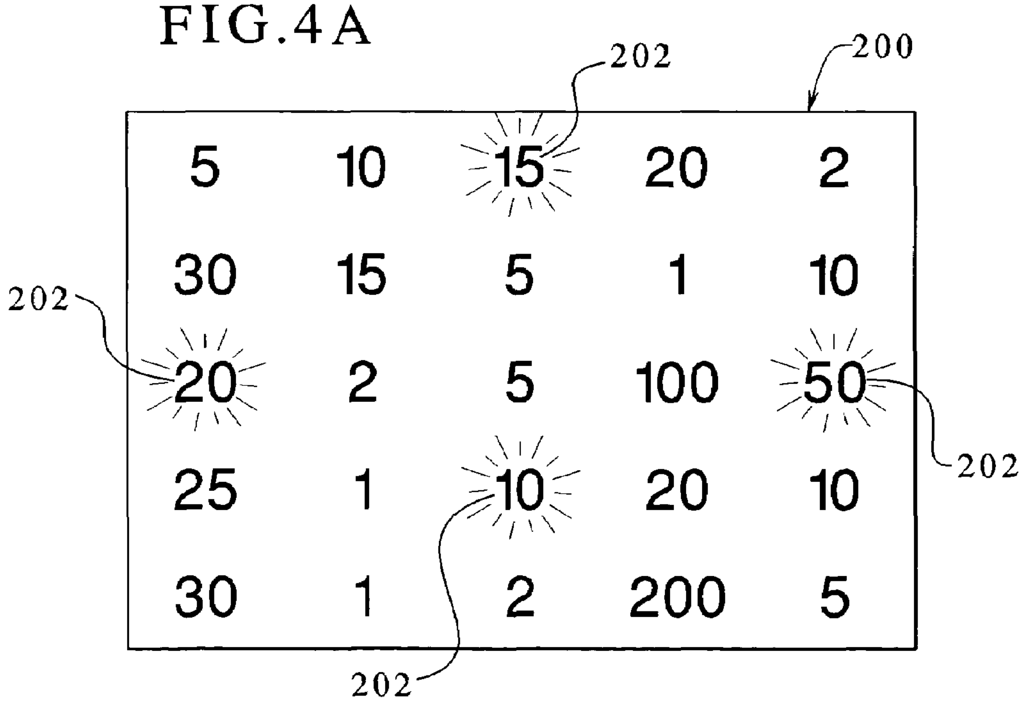
FIGS. 4A to 4C are tables which illustrate the gaming device selecting the offers to be associated with the player selectable selections of the present invention.
Figure 4B:
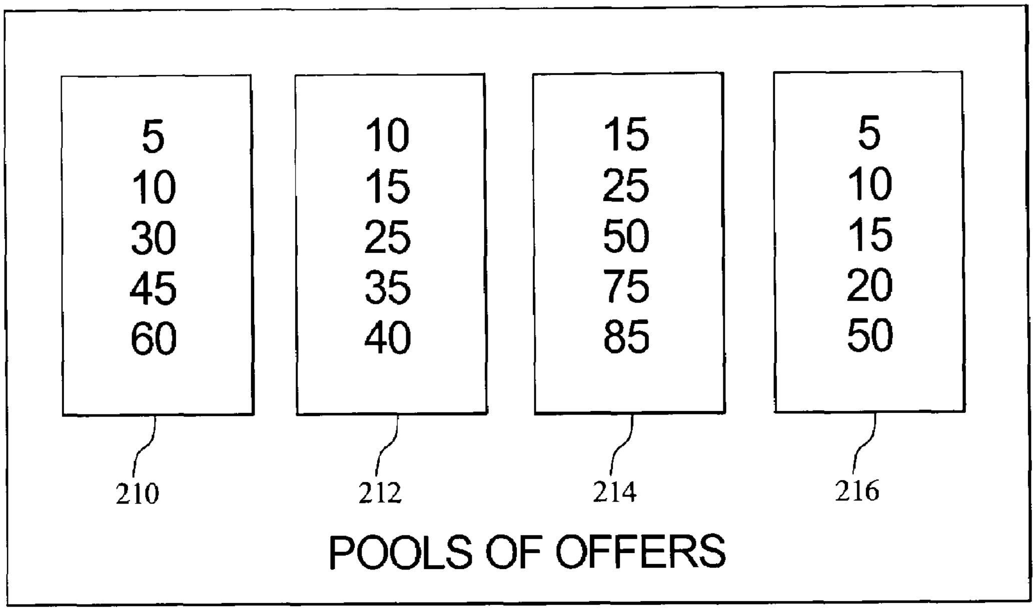
Figure 4C:
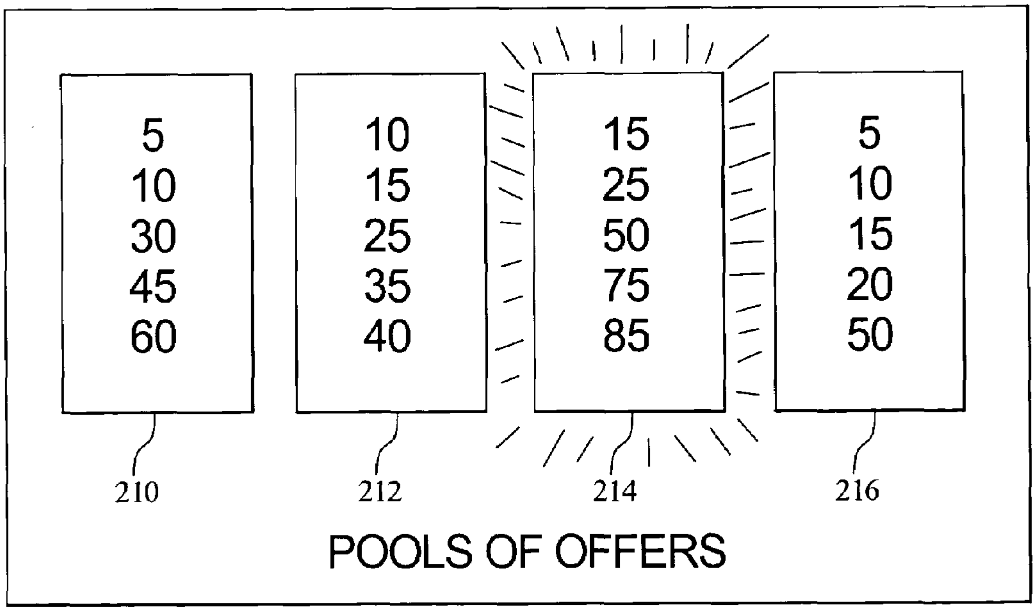

In one embodiment, the gaming device randomly selects the offers from a pre-determined pool of offers. For example, as illustrated in FIG. 4A upon the initiation of the bonus scheme, the gaming device selects a plurality of offers 202 from a predetermined pool of offers 200. In an alternative embodiment, the gaming device selects the offers from multiple predetermined pools of offers. For example, as illustrated in FIGS. 4B and 4C, there are four pre-determined pools of offers 210, 212, 214 and 216. Upon the initiation of the bonus game, the gaming device selected the pre-determined pool of offers 214 with the award values of fifteen, twenty-five, fifty, seventy-five and eighty-five. In another alternative embodiment, the gaming device randomly selects offers from a pre-determined range of offer amounts. For example, as illustrated in FIG. 4A, the pre-determined range of offer amounts is from one to two-hundred.

In alternative embodiments of the present invention, the number of possible offers may be greater than, less than or equal to the number of possible selections for the player to select. In one embodiment, once an offer or symbol is associated with a selection, that offer or selection is not associated with another selection during a particular bonus round. In another embodiment, the same offer or symbol is associated with a plurality of selections in a particular bonus round.

In another embodiment, all of the associated offers and symbols are revealed on a separate display. In this embodiment, the current offer may be highlighted on the separate display. In an alternative embodiment, the maximum associated offer is separately displayed. In another embodiment, the minimum associated offer is separately displayed. In an alternative embodiment, an average of all the associated offers is separately displayed. In another embodiment, a plurality of random associated offers are separately displayed.

In one embodiment, upon triggering the bonus scheme the gaming device provides the player with a plurality of opportunities to select an offer. Each time the player chooses from the plurality of selections, the number of opportunities remaining to select an offer is reduced by one. The number of opportunities for the player to select an offer is preset or may be randomly determined. For increased entertainment, in another embodiment, the number of remaining opportunities in the bonus scheme may not be revealed to the player. In an alternative embodiment, the player does not have a plurality of opportunities to select an offer. In this embodiment, the bonus scheme ends when the player has either accepted an offer or a termination symbol is associated with a picked selection.

At least one terminator or termination symbol is associated with at least one selection. Alternatively, a plurality of termination symbols may be respectively associated with a plurality of selections. If a termination symbol is associated with the player selected selection, then the bonus scheme terminates and the game will provide the player no award, provide the player the last rejected award, provide the player a consolation award or provide the player with the award associated with the next selection. In another embodiment, if a termination symbol is associated with the player selected selection, then the bonus scheme ends and the game will provide the player a randomly selected award. In an alternative embodiment, if a termination symbol is associated with the player selected selection, the number of opportunities remaining to select an offer may be reduced by a preset or randomly determined amount.

In the primary embodiment of the present invention, at least one anti-terminator or anti-termination symbol is associated with at least one selection. If the player picks a selection that has an anti-termination symbol associated with it, the player retains the anti-termination symbol. In the event that in subsequent selections the player picks a selection that has a termination symbol associated with it, the retained anti-termination symbol is used to nullify the bonus scheme ending effect of the termination symbol. In an alternative embodiment, a plurality of anti-termination symbols may be respectively associated with a plurality of selections. In another embodiment, an anti-termination symbol may be used as a multiplier of the players next selected potential offer. In yet another embodiment, if an anti-termination symbol is associated with the player selected selection, then the player may be granted additional opportunities to obtain offers. It should be appreciated that the present invention's anti-terminator is player selectable from a plurality of selections. It should further be appreciated that the present invention's anti-terminator is preferably obtained during the bonus scheme of the present invention.

In one alternative embodiment of the present invention, one or more anti-terminators or anti-termination symbols may be obtained in the base game of the gaming device. These anti-terminators are retained by the processor of the gaming device. When a bonus game is initiated, the anti-terminators become available for use by the player in the bonus game. In one embodiment of the present invention, the anti-terminators are obtained in the base game and retained by the processor when, an anti-terminator symbol is displayed to the player, appears on a payline, appears on a winning payline, appears in combination with a winning combination, or appears in combination with a bonus triggering symbol or combination of symbols.

In another embodiment of the present invention, every time an offer associated with a player selected selection is at least a preset amount, the gaming device may recommend the player to accept said potential offer. For increased entertainment, the gaming device could recommend the player to accept an offer associated with a player selected selection before the offer has been revealed to the player.

Figure 3B:
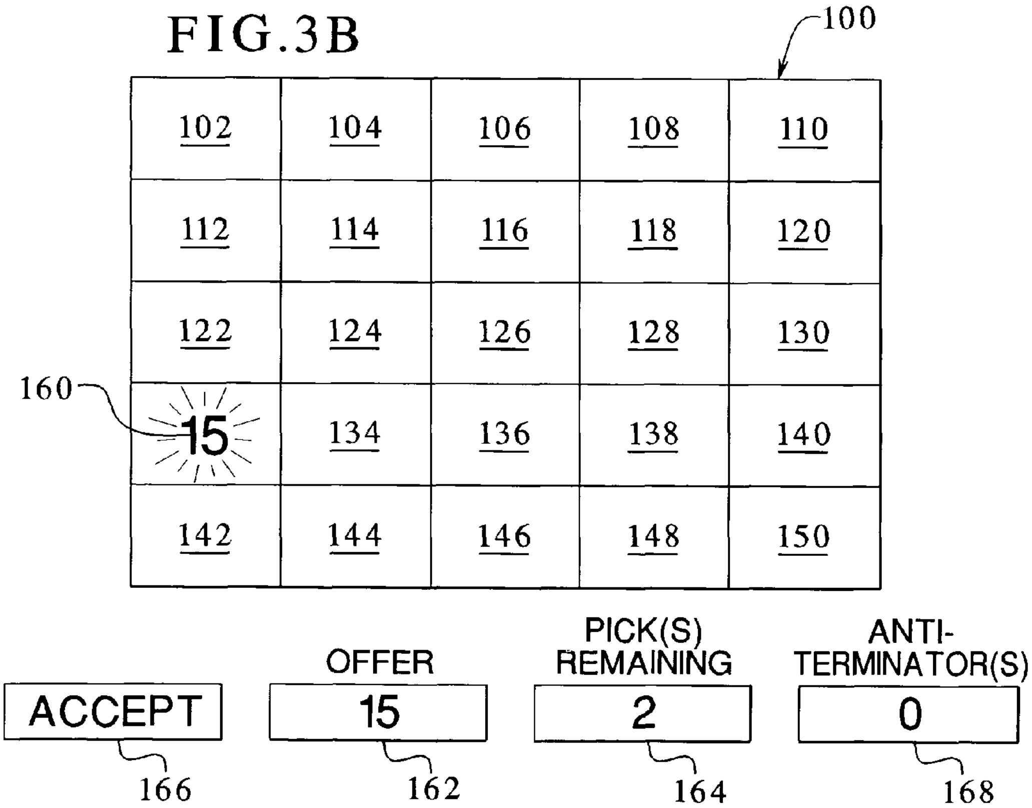
FIG. 3B is a front elevational view of the offer selection screen of one embodiment of the present invention illustrating a player picked offer revealed.

In one embodiment of the present invention, as further illustrated in FIG. 3B, the gaming device provides the player with an offer and acceptance display, which is preferably a touch screen which provides the player with the offer 162, the number of anti-terminators 168 the player has obtained and the number of remaining opportunities 164 the player has remaining in the bonus scheme. If the player has zero remaining opportunities to select a selection, then the player is awarded the last revealed offer. If the player has at least one remaining opportunities to select a selection, then the player may accept the revealed offer using an accept indicator 166 or select another selection. If the player accepts the revealed offer, the gaming device provides the player with the revealed offer, the player cannot obtain any more offers and the bonus scheme terminates. If the player selects another selection, then the previously revealed offer remains revealed and the player may not reselect that selection.

Referring now to FIGS. 3A to 3G, in one embodiment of the present invention, there are twenty-five selections 102 through 150, each with an offer or symbol associated with it. The player chooses one of the selections to obtain an offer or symbol. As illustrated in FIG. 3B, when the player makes a selection, the gaming device reveals the offer or symbol associated with the selected selection 160. In FIG. 3B, the player picks selection 132 which has an associated offer of fifteen credits. Appropriate messages such as "PICK A SELECTION TO OBTAIN AN OFFER" and "YOUR SELECTION HAS AN OFFER OF 15 CREDITS" are preferably provided to the player visually, or through suitable audio or audiovisual displays.

Figure 3C:
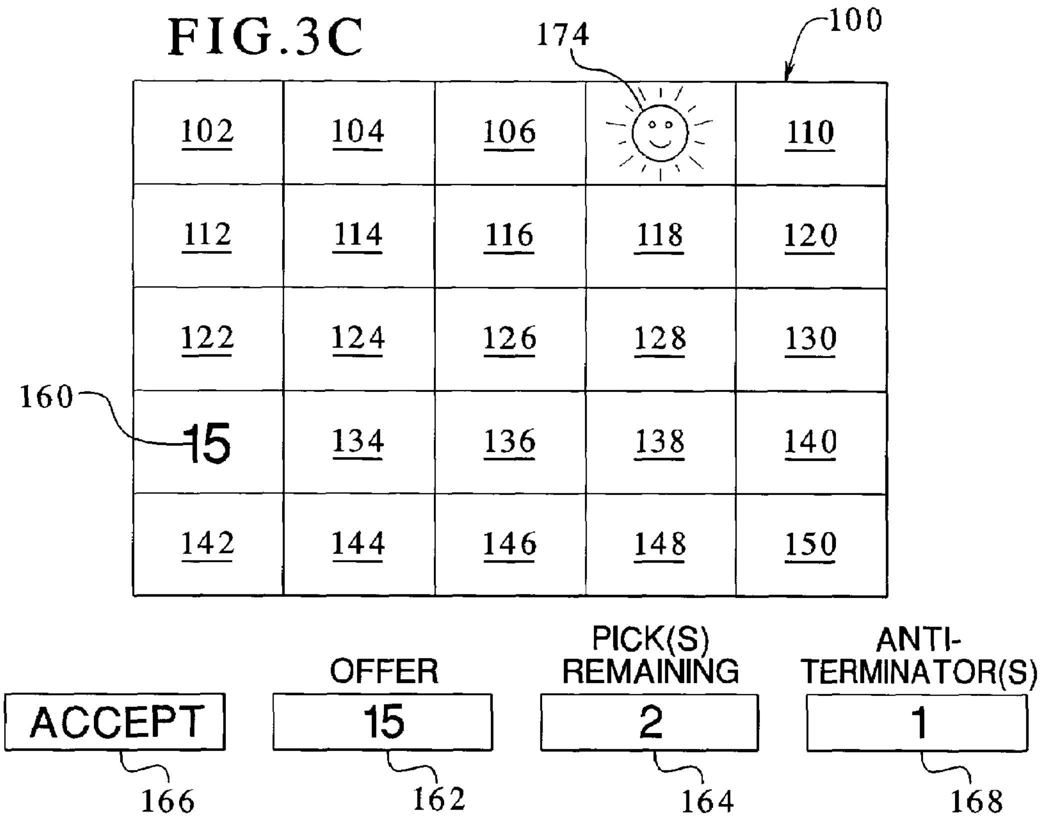
FIG. 3C is a front elevational view of the offer selection screen of one embodiment of the present invention illustrating a player picked anti-termination symbol revealed and retained.

As illustrated in FIG. 3C, the player chooses not to accept the offer of fifteen, and to pick another selection. The player's second pick is selection 108, which has an anti-termination symbol 174 associated with it. When an anti-termination symbol is revealed, in one embodiment the number of opportunities 164 to select a selection is not reduced. In an alternative embodiment, the number of opportunities to select a selection 164 may be reduced by one (or more) when an anti-termination symbol is revealed. Furthermore, the offer 162 remains the last revealed offer.

Figure 3D:
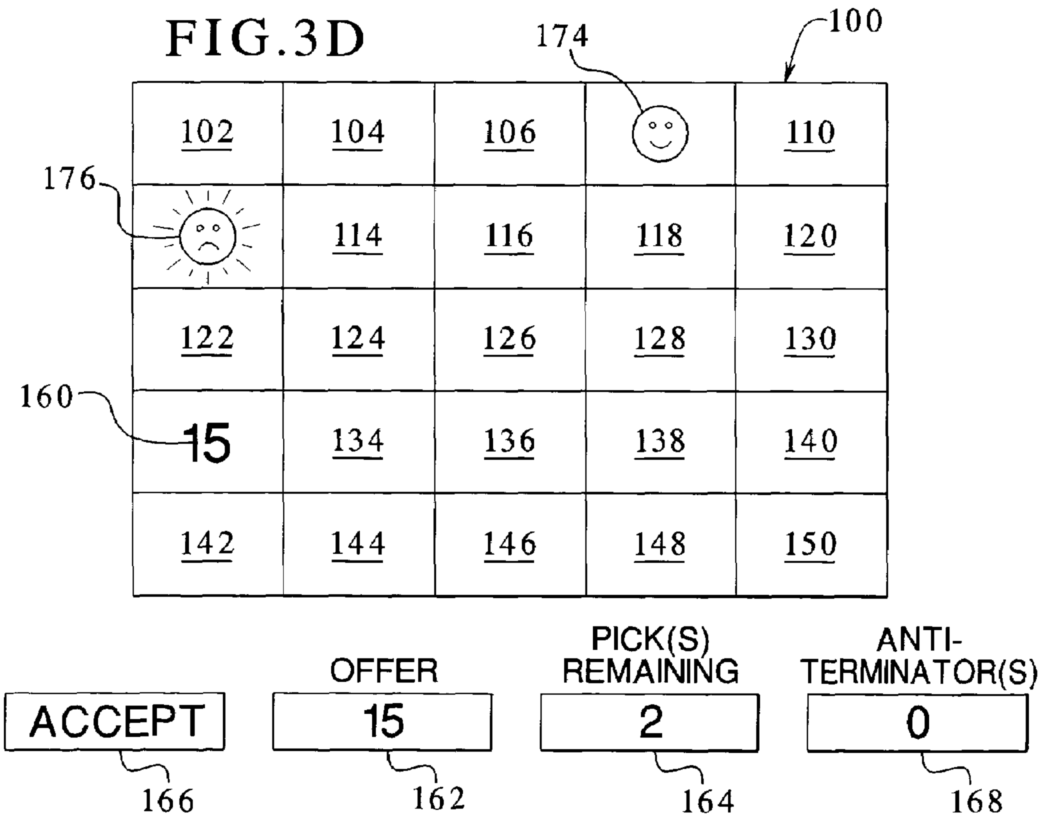
FIG. 3D is a front elevational view of the offer selection screen of one embodiment of the present invention illustrating a player picked termination symbol being nullified by a retained anti-termination symbol.

After obtaining an anti-termination symbol the player proceeds picking selections to reveal associated offers. As illustrated in FIG. 3D, the player's third pick is selection 112, which has a termination symbol 176 associated with it. In this case, the player's previously obtained anti-termination symbol is automatically used to nullify the termination symbol. In one embodiment, the number of opportunities to select a selection is not reduced when an anti-termination symbol nullifies a termination symbol. In an alternative embodiment, the number of opportunities to select a selection 164 may be reduced by one (or more) when an anti-termination symbol is used to nullify the effect of a termination symbol. The player's number of anti-terminators 168 is reduced by one each time an anti-termination symbol is used to nullify a termination symbol.

Figure 3E:
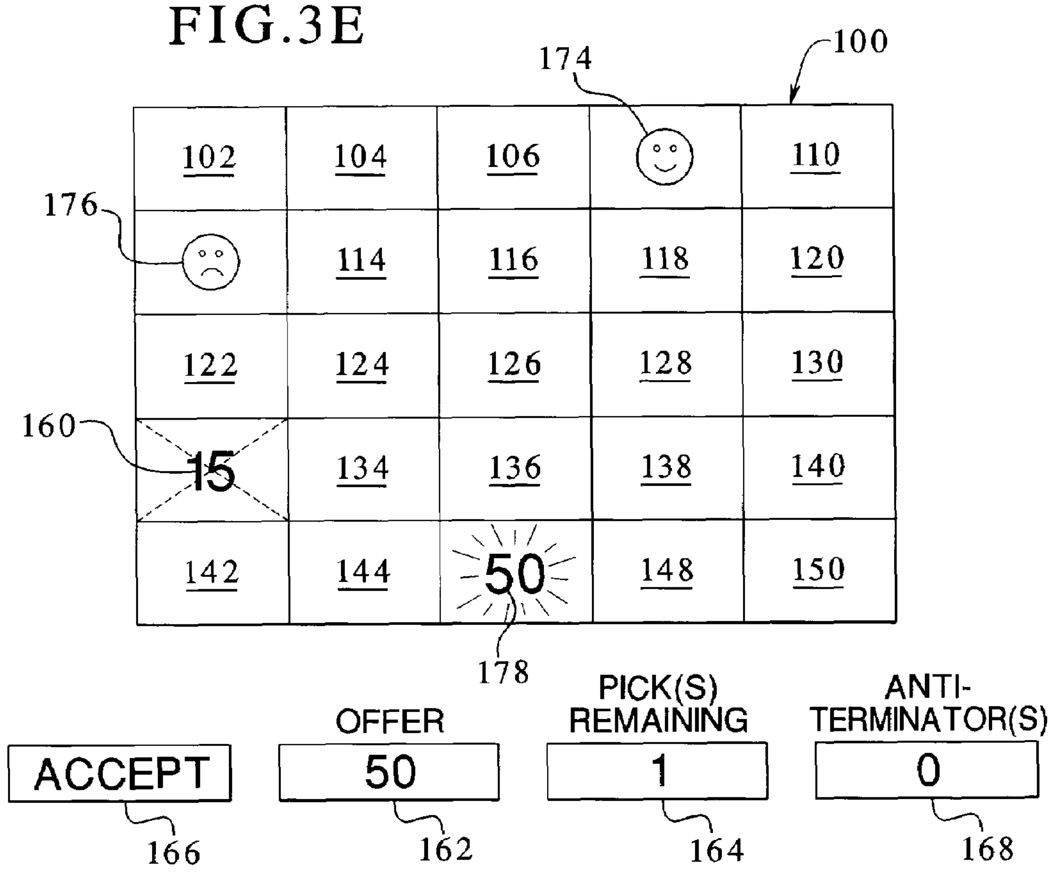
FIG. 3E is a front elevational view of the offer selection screen of one embodiment of the present invention illustrating a previously revealed offer remaining revealed and a subsequent player picked offer revealed.

As illustrated in FIG. 3E, the players fourth pick is selection 146 which has an offer of fifty credits associated with it. In this case, the previously picked selection and its revealed associated offer of fifteen remains revealed 160, and as indicated in phantom may not be selected by the player. Additionally, once the bonus scheme terminates, the gaming device may reveal all of the offers or symbols associated with the plurality of selections.

Figure 3F:
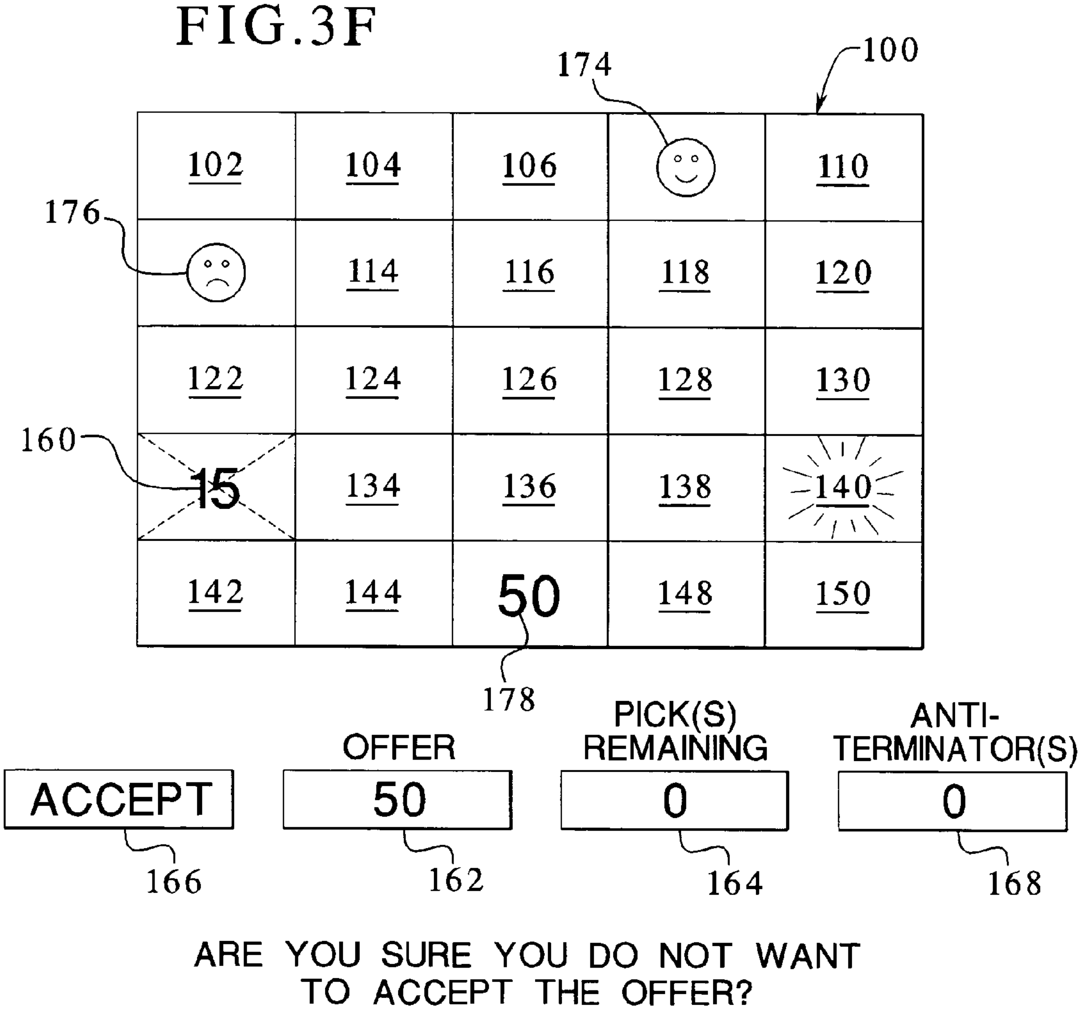
FIG. 3F is a front elevational view of the offer selection screen of one embodiment of the present invention illustrating the gaming device recommending that the player accept a previous offer prior to revealing an offer associated with another picked selection.
Figure 3G:
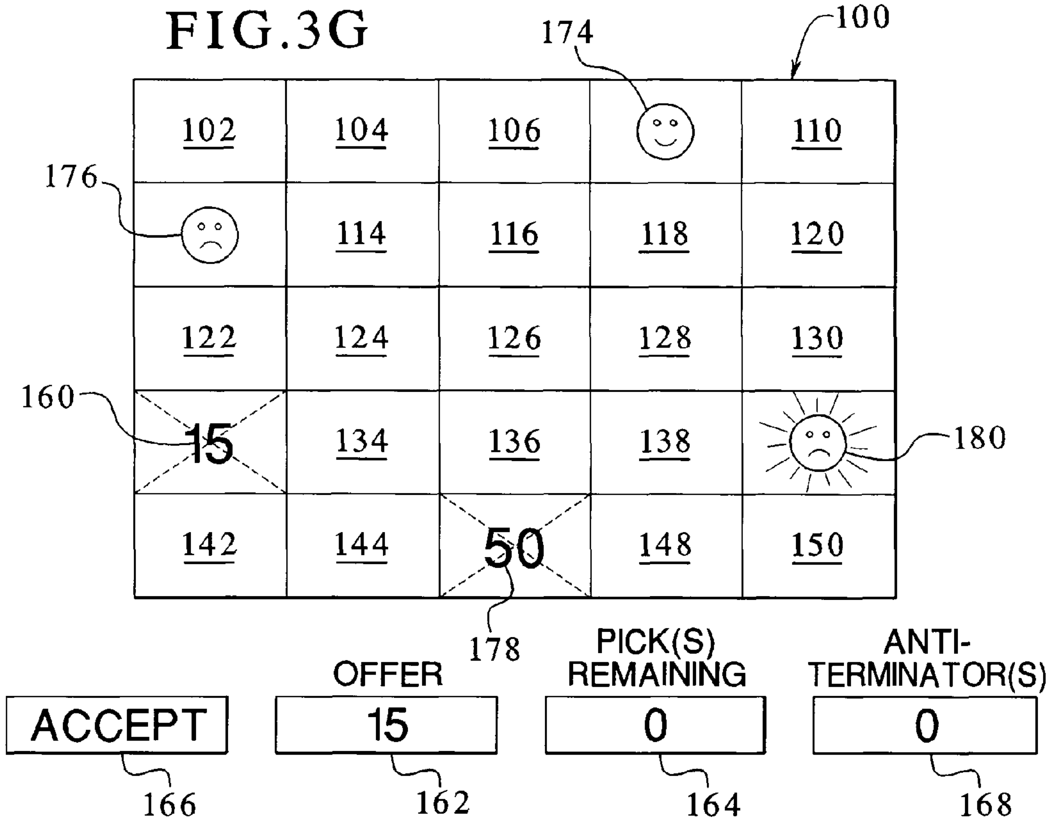
FIG. 3G is a front elevational view of the offer selection screen of one embodiment of the present invention illustrating a player picked terminator symbol terminating the bonus game.
Figure 3H:
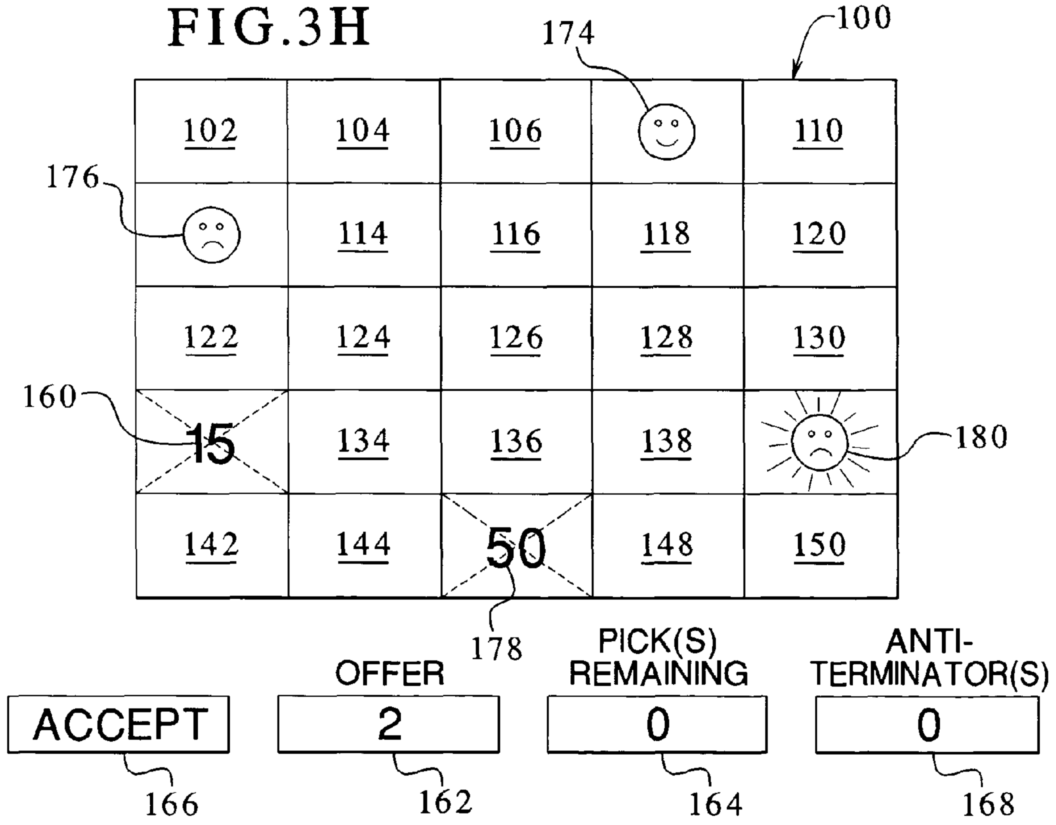
FIG. 3H is a front elevational view of the offer selection screen of one embodiment of the present invention illustrating a player provided a consolation award when a player picked terminator symbol terminates the bonus game.
Figure 3I:
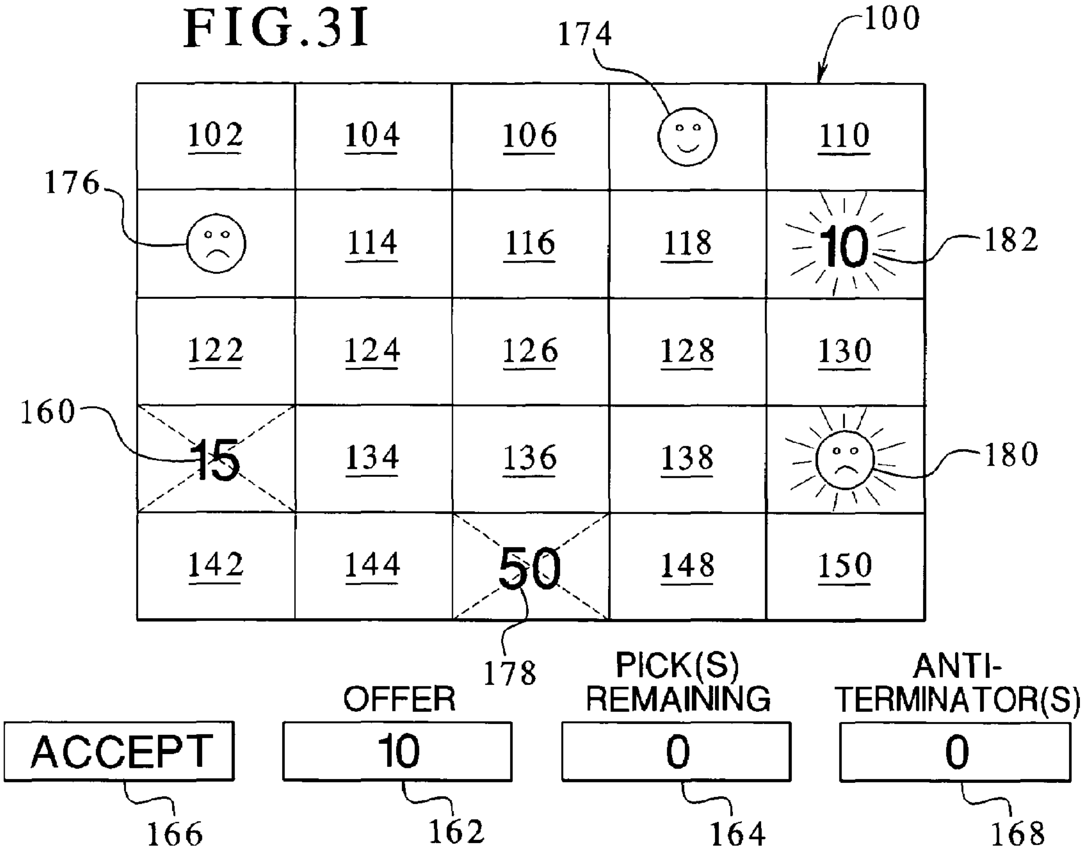
FIG. 3I is a front elevational view of the offer selection screen of one embodiment of the present invention illustrating a player provided a consolation award when a player picked terminator symbol terminates the bonus game.

As illustrated in FIG. 3F, if the player's fifth pick is highlighted selection 140, the gaming device recommends that the player accept the previous offer of fifty. Appropriate messages such as "ARE YOU SURE YOU DO NOT WANT TO ACCEPT THE OFFER?" are preferably provided to the player visually, or through suitable audio or audiovisual displays. As illustrated in FIG. 3G, if the player does not accept the previous offer, the gaming device reveals an associated termination symbol 180. As the player does not have a previously obtained anti-termination symbol, the bonus scheme ends. In this embodiment, the player would be awarded fifty credits (the player's last unaccepted offer) as their bonus award. In an alternative embodiment illustrated in FIG. 3H, the player is provided a consolation award of two credits. As seen in FIG. 3I, in another embodiment, the player is provided an award of ten credits 182 which is the offer associated with subsequent non-picked selection 120.

In one alternative embodiment of the present invention, if a retained anti-terminator is not employed to nullify a terminator or termination symbol before a player accepts an offer, the processor increases the award based on the number of anti-terminates retained by the processor when the player accepts an offer. The anti-terminator could provide a predetermined or randomly determined modification of the accepted offer for each retained anti-terminator. For instance, a multiplier or an additional award, value or number of credits could be associated with the anti-terminator or with each anti-terminator. The value or modifier associated with the anti-terminator could be applied by the processor in all instances or applied randomly. This increases the award offered to the player and cause the player to consider accepting each award if the player has obtained an anti-terminator.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention claimed is:

1. A gaming device comprising:

a primary game operable upon a wager by a player;

a plurality of player selectable selections;

a plurality of offers associated with a plurality of said selections;

at least one terminator associated with one of said selections;

at least one anti-terminator associated with one of said selections; and a triggering event in said primary wagering game, wherein after the occurrence of said trigging event the player is enabled to pick one of the selections, said anti-terminator is retained if said anti-terminator is associated with the player picked selection, a terminating event occurs if said terminator is associated with the player picked selection and said anti-terminator is not retained, the player is enabled to accept the offer associated with the player picked selection if one of said offers is associated with the player picked selection, said accepted offer is provided to the player if the player accepts the offer associated with the player picked selection and the player is enabled to pick at least one subsequent selection if the player does not accept the offer associated with the player picked selection, wherein if said terminator is associated with the subsequently picked selection, said retained anti-terminator nullifies said terminator associated with the subsequently picked selection.

2. The gaming device of claim 1, wherein a plurality of terminators are associated with the selections, wherein each terminator is associated with one of said selections.

3. The gaming device of claim 1, wherein a plurality of anti-terminators are associated with the selections, wherein each anti-terminator is associated with one of said selections.

4. The gaming device of claim 1, wherein a number of terminators associated with said selections is greater than a number of anti-terminators associated with said selections.

5. The gaming device of claim 1, wherein a recommendation that the player accepts a previous offer is displayed prior to revealing the offer associated with at least one of the player picked selections.

6. The gaming device of claim 1, wherein if one of the selections associated with a terminator is picked and at least one anti-terminator is not retained, the player is provided an award which is selected from the group consisting of: a previous offer, a consolation award and an award associated with a subsequent selection.

7. The gaming device of claim 1, wherein if any anti-terminator is retained when the player accepts an offer, a modifier associated with said anti-terminator is applied to the accepted offer.

8. A gaming device comprising:

a primary wagering game operable upon a wager by a player;

a plurality of player selectable selections;

a plurality of offers associated with a plurality of said selections;

a plurality of terminators associated with a plurality of said selections;

a plurality of anti-terminators associated with a plurality of said selections; and a triggering event in said primary wagering game, wherein after the occurrence of said trigging event the player is enabled to pick one of the selections, one of said anti-terminators is retained if one of said anti-terminators is associated with the player picked selection, a terminating event occurs if one of said terminators is associated with the player picked selection and one of said anti-terminators is not retained, the player is enabled to accept the offer associated with the player picked selection if one of said offers is associated with the player picked selection, said accepted offer is provided to the player if the player accepts the offer associated with the player picked selection and the player is enabled to pick at least one subsequent selection if the player does not accept the offer associated with the player picked selection, wherein if one of said terminators is associated with the subsequently picked selection, said retained anti-terminator nullifies said terminator associated with the subsequently picked selection.

9. The gaming device of claim 8, wherein a number of terminators associated with said selections is greater than a number of anti-terminators associated with said selections.

10. The gaming device of claim 8, wherein if one of the selections associated with a terminator is picked and at least one anti-terminator is not retained, the player is provided an award which is selected from the group consisting of: a previous offer; a consolation award and an award associated with a subsequent selection.

11. The gaming device of claim 8, wherein a recommendation that the player accepts a previous offer is displayed prior to revealing the offer associated with at least one of the player picked selections.

12. A gaming device comprising:

a primary game operable upon a wager by a player;

a plurality of player selectable selections;

a plurality of offers associated with a plurality of said selections;

a number of player picks of said selections;

at least one terminator associated with one of said selections;

at least one anti-terminator associated with one of said selections; and a triggering event in said primary wagering game, wherein after the occurrence of said trigging event the player is enabled to pick one of the selections, said anti-terminator is retained if said anti-terminator is associated with the player picked selection, a terminating event occurs if said terminator is associated with the player picked selection and said anti-terminator is not retained, the player is enabled to accept the offer associated with the player picked selection if one of said offers is associated with the player picked selection, said accepted offer is provided to the player if the player accepts the offer associated with the player picked selection and the player is enabled to pick at least one subsequent selection if the player does not accept the offer and the player has at least one of said picks of said selections remaining wherein if said terminator is associated with the subsequently picked selection, said retained anti-terminator nullifies said terminator associated with the subsequently picked selection.

13. The gaming device of claim 12, wherein the plurality of player picks is increased by at least one if the player picks a selection having an anti-terminator associated with said selection.

14. The gaming device of claim 12, wherein the number of player picks is displayed to the player.

15. A gaming device comprising:

a plurality of selections;

a plurality of offers associated with said plurality of selections;

a plurality of player picks of said selections;

at least one terminator associated with one of said plurality of selections;

at least one anti-terminator associated with one of said plurality of selections;

a display device; and a processor operable with the display device to:

(a) enable a player to pick one of said selections;

(b) reveal to the player the offer, anti-terminator or terminator associated with the picked selection;

(c) accumulate any revealed anti-terminators;

(d) perform a terminating event if said terminator is revealed and the processor does not have any accumulated anti-terminators;

(e) apply any accumulated anti-terminator to a revealed terminator, if said terminator is revealed, wherein each accumulated anti-terminator can be applied to one terminator;

(f) enable the player to accept the revealed offer or select another selection if there is at least one non-picked selection and the terminating event is not performed; and (g) repeat steps (b) to (f) at least once if said player does not accept said revealed offer or if the terminating event is not performed.

16. The gaming device of claim 15, which includes a plurality of terminators associated with said selections.

17. The gaming device of claim 15, which includes an award modifier associated with said anti-terminator, wherein the processor applies the award modifier to an offer accepted by the player if the player accepts an award when the processor has an accumulated anti-terminator.

18. A gaming device comprising:

a primary game operable upon a wager by a player;

a plurality of selections;

a plurality of offers associated with said plurality of selections;

a plurality of player picks of said selections;

at least one terminator associated with one of said plurality of selections;

at least one anti-terminator associated with one of said plurality of selections; and a triggering event in said primary wagering game, wherein after the occurrence of said triggering event:

(a) the player is enabled to pick one of said selections;

(b) the offer, anti-terminator or terminator associated with the picked selection is revealed to the player;

(c) any revealed anti-terminators are retained;

(d) a terminating event is performed if said terminator is revealed and no anti-terminators are accumulated;

(e) any accumulated anti-terminator is applied to a revealed terminator, if said terminator is revealed, wherein each accumulated anti-terminator can be applied to one terminator;

(f) the player is enabled to accept the revealed offer or select another selection if there is at least one non-picked selection and the terminating event is not performed; and (g) steps (b) to (f) are repeated at least once if the player does not accept said revealed offer or if the terminating event is not performed.

19. A gaming device comprising:
a plurality of selections;
a plurality of offers associated with said plurality of selections;
at least one anti-terminator associated with one of said selections;
a display device; and
a processor operable with said display device to enable a player to pick one of said selections, retain any anti-terminator associated with the player picked selection, reveal the offer associated with the player picked selection, enable the player to accept or reject the offer associated with the player picked selection, provide the revealed offer to the player if the player accepts the offer, enable the player to pick at least one subsequent selection if the player rejects the revealed offer and reveal the offer associated with the subsequent player picked selection.

20. The gaming device of claim 19, which includes a number of player picks of said selections, wherein the processor reduces the number of picks of said selections each time the player picks one of said selections.

21. The gaming device of claim 20, wherein the processor enables the player to accept or reject the offer associated with the player picked selection if the number of player picks is at least one.

22. A gaming device comprising:
a primary game operable upon a wager by a player;
a plurality of selections;
a plurality of offers associated with said plurality of selections;
at least one anti-terminator associated with one of said selections; and
a triggering event in said primary wagering game, wherein after the occurrence of said triggering event, the player is enabled to pick one of said selections, any anti-terminator associated with the player picked selection is retained, the offer associated with the player picked selection is revealed, the player is enabled to accept or reject the offer associated with the player picked selection, the revealed offer is provided to the player if the player accepts the revealed offer, the player is enabled to pick at least one subsequent selection if the player rejects the revealed offer and the offer associated with the subsequent player picked selection is revealed.

23. The gaming device of claim 22, which includes a number of player picks of said selections, wherein the number of picks of said selections is reduced by one each time the player picks one of said selections.

24. The gaming device of claim 23, wherein the player is enabled to accept or reject the offer associated with the player picked selection if the number of player picks is at least one.

25. A gaming device comprising:
a display device;
a base game;
at least one anti-terminator adapted to be obtained in the base game;
a bonus game triggering event adapted to randomly occur in the base game;
a bonus game including:
(a) a plurality of selections displayed by the display device,
(b) a plurality of offers associated with said selections,
(c) at least one terminator associated with one of said selections, and
(d) an offer acceptor for enabling the player to accept one of the offers made to the player; and
a processor which communicates with the display device and the offer acceptor, controls the base game and the bonus game, randomly provides and retains each anti-terminator obtained in the base game for use in the bonus game, and upon the occurrence of the bonus game triggering event in the base game, randomly associates said offers with the selections, provides the player any award associated with picked selections, causes selections to be picked until the player accepts an offer or until the player picks one of the selections having a terminator associated with said selection and the processor does not have any retained anti-terminators.

26. The gaming device of claim 25, which includes a plurality of terminators associated with the selections, wherein each said terminator is associated with one of said selections.

27. The gaming device of claim 26, which includes a plurality of anti-terminators in the base game.

28. The gaming device of claim 27, wherein said display device displays a number of the anti-terminators retained by the processor.

29. The gaming device of claim 25, wherein the processor provides the player with a consolation award if a terminator is associated with the selection picked by the player and the processor does not have a retained anti-terminator.

30. The gaming device of claim 25, wherein the processor randomly selects said offers associated with the selection from a pool of offers.

31. The gaming device of claim 25, wherein the processor randomly selects said offers associated with the selections from a plurality of pools of offers.

32. The gaming device of claim 25, wherein the processor randomly selects said offers associated with the selections from a predetermined range of offers.

33. The gaming device of claim 25, wherein the number of offers is equal to the number of selections.

34. The gaming device of claim 25, wherein prior to revealing an offer associated with at least one of the selections, the display device displays a recommendation that the player accept a previous offer.

35. A method of operating a gaming device, said method comprising:
(a) associating a plurality of offers, at least one terminator and at least one anti-terminator with a plurality of selections;
(b) enabling a player to pick one of said plurality of selections;
(c) retaining said anti-terminator if said anti-terminator is associated with the player picked selection;
(d) performing a terminating event if said terminator is associated with the player picked selection and at least one anti-terminator is not retained;
(e) nullifying the terminator if said terminator is associated with the player picked selection and at least one anti-terminator is retained;
(f) enabling the player to accept or reject the offer associated with the player picked selection if one of said offers is associated with the player picked selection;
(g) providing said accepted offer to the player if the player accepts the offer associated with the player picked selection; and (h) repeating steps (b) to (g) at least once if the player rejects the offer associated with the player picked selection and the terminating event is not performed.

36. The method of claim 35, which is provided to the player through a data network.

37. The method of claim 36, wherein the data network is an internet.

38. A method of operating a gaming device, said method comprising:

(a) associating a plurality of offers, a plurality of terminators and a plurality of anti-terminator with a plurality of selections;

(b) enabling a player to pick one of said plurality of selections;

(c) retaining one of said anti-terminators if one of said anti-terminators is associated with the player picked selection;

(d) performing a terminating event if one of said terminators is associated with the player picked selection and at least one of said anti-terminators is not retained;

(e) nullifying the terminator if one of said terminators is associated with the player picked selection and at least one of said anti-terminators is retained;

(f) enabling the player to accept or reject the offer associated with the player picked selection if one of said offers is associated with the player picked selection;

(g) providing said accepted offer to the player if the player accepts the offer associated with the player picked selection; and (h) repeating steps (b) to (g) at least once if the player rejects the offer associated with the player picked selection and the terminating event is not performed.

39. The method of claim 38, which is provided to the player through a data network.

40. The method of claim 39, wherein the data network is an internet.

41. A method of operating a gaming device, said method comprising:

(a) associating a plurality of offers, at least one terminator and at least one anti-terminator with a plurality of selections;

(b) enabling a player to pick one of said plurality of selections, wherein a number of player picks of said selections is decreased by one for each player pick;

(c) retaining said anti-terminator if said anti-terminator is associated with the player picked selection;

(d) performing a terminating event if said terminator is associated with the player picked selection and at least one anti-terminator is not retained;

(e) nullifying the terminator if said terminator is associated with the player picked selection and at least one anti-terminator is retained;

(f) enabling the player to accept or reject the offer associated with the player picked selection if one of said offers is associated with the player picked selection;

(g) providing said accepted offer to the player if the player accepts the offer associated with the player picked selection; and (h) repeating steps (b) to (g) at least once or until the player has no remaining picks of said selections if the player rejects the offer associated with the player picked selection and the terminating event is not performed.

42. The method of claim 41, which is provided to the player through a data network.

43. The method of claim 42, wherein the data network is an internet.

44. A method of operating a gaming device, said method comprising:

(a) associating a plurality of offers with a plurality of selections;

(b) enabling a player to pick one of said selections;

(c) retaining any anti-terminator associated with the player picked selection;

(d) revealing the offer associated with the player picked selection;

(e) enabling the player to accept or reject the offer associated with the player picked selection;

(f) providing the revealed offer to the player if the player accepts the offer;

(g) enabling the player to pick at least one subsequent selection if the player rejects the revealed offer; and (h) revealing the offer associated with the subsequent player picked selection.

45. The method of claim 44, which is provided to the player through a data network.

46. The method of claim 45, wherein the data network is an internet.

47. A method of operating a gaming device, said method comprising:

(a) associating a plurality of offers with a plurality of selections;

(b) enabling a player to pick one of said selections;

(c) retaining any anti-terminator associated with the player picked selection;

(d) revealing the offer associated with the player picked selection;

(e) enabling the player to accept or reject the offer associated with the player picked selection;

(f) providing the revealed offer to the player if the player accepts the offer; and (g) repeating steps (b) to (f) at least once if the player rejects the offer associated with the player picked selection.

48. The method of claim 47, which is provided to the player through a data network.

49. The method of claim 48, wherein the data network is an internet.

* * * * *